US010421882B1

(12) United States Patent
Tsang

(10) Patent No.: US 10,421,882 B1
(45) Date of Patent: Sep. 24, 2019

(54) POLYSILOXANE BASED COATING COMPOSITIONS

(71) Applicant: The Government of the United States of America as Represented by the Secretary of the Navy, Arlington, VA (US)

(72) Inventor: Joseph W. Tsang, Ridgecrest, CA (US)

(73) Assignee: The Government of the United States of America as Represented by the Secretary of the Navy, Washington, DC (US)

( * ) Notice: Subject to any disclaimer, the term of this patent is extended or adjusted under 35 U.S.C. 154(b) by 234 days.

(21) Appl. No.: 15/234,353

(22) Filed: Aug. 11, 2016

Related U.S. Application Data

(63) Continuation-in-part of application No. 13/898,958, filed on May 21, 2013, now abandoned.

(60) Provisional application No. 61/649,581, filed on May 21, 2012.

(51) Int. Cl.
  *C09D 183/14* (2006.01)
  *B05D 3/00* (2006.01)
  *B05D 1/02* (2006.01)
  *B05D 1/28* (2006.01)

(52) U.S. Cl.
  CPC ............. *C09D 183/14* (2013.01); *B05D 1/02* (2013.01); *B05D 1/28* (2013.01); *B05D 3/007* (2013.01)

(58) Field of Classification Search
  CPC .......... C09D 183/14; B05D 1/02; B05D 1/28; B05D 3/007
  See application file for complete search history.

(56) References Cited

U.S. PATENT DOCUMENTS

| 6,391,999 B1 * | 5/2002 | Crivello | ............... C08G 77/045 528/12 |
| 2002/0137870 A1 * | 9/2002 | Crivello | ............... C07F 7/1892 528/10 |
| 2007/0213492 A1 * | 9/2007 | Mowrer | ............... C08L 83/10 528/17 |
| 2013/0158159 A1 | 6/2013 | Iyer | |

FOREIGN PATENT DOCUMENTS

WO  WO-2014124378 A1 *  8/2014  ............ C09J 183/06

OTHER PUBLICATIONS

U.S. Appl. No. 13/898,958, Joseph Tsang, related case.
Grunlan et al. "Synthesis of alpha,omega-Bis Epoxy Oligo (1 'H, 1 'H, 2 'H, 2 'H-Perfluoroalkyl Siloxane) s and Properties of Their Photo-Acid Cross-Linked Films" Chem. Mater. 2004, 16, 12, 2433-2441.

* cited by examiner

*Primary Examiner* — Robert S Walters, Jr.
(74) *Attorney, Agent, or Firm* — Stuart H. Nissim

(57) ABSTRACT

An epoxy-polysiloxane prepolymer composition(s) including, a mixture of polysiloxane oligomers having at least two epoxy groups, at least one monofunctional epoxy-siloxane as a reactive diluents, at least one amine, at least one pigment and/or at least one filler, at least one pigment dispersing agent, and at least one defoamer.

10 Claims, No Drawings

POLYSILOXANE BASED COATING COMPOSITIONS

CROSS-REFERENCE TO RELATED APPLICATIONS

This is a continuation-in-part patent application claiming the benefit of non-provisional patent application Ser. No. 13/898,958 filed on May 21, 2013, which claims the benefit of, parent provisional patent application Ser. No. 61/649,581 filed on May 21, 2012, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments of the invention generally relate to the synthesis of hybrid epoxy-siloxane oligomers, formulating, and curing with an amine hardener to form topcoats that meet military specifications including ultraviolet (UV) and sunlight weathering, chemical resistance, adhesion, free of volatile organic compounds (VOC) and hazard air pollutants (HAPs), and film forming properties.

DETAILED DESCRIPTION OF THE EMBODIMENTS OF THE INVENTION

Embodiments of the invention generally relate to the synthesis of hybrid epoxy-siloxane oligomers, formulating, and curing with an amine hardener to form topcoats that meet military specifications including ultraviolet (UV) and sunlight weathering, chemical resistance, adhesion, free of volatile organic compounds (VOC) and hazard air pollutants (HAPs), and film forming properties. These materials are critical for the development and use in harsh environmental conditions.

Military polyurethane coatings are formed from the reaction of polyols with diisocyanate compounds including hexamethylene diisocyanate (HDI), methyl diphenyl diisocyanate (MDI), and toluene diisocyanate (TDI). While these coatings meet performance requirements in accordance with MIL-DTL-53039, MIL-DTL-64159B and MIL-PRF-85285D, the diisocyanate compounds, HDI, MDI and TDI used in the formation of polyurethanes are highly toxic to organism, including humans. Furthermore, they are already listed as hazardous air pollutants (HAPs) under the Clean Air Act.

Epoxy topcoats have been widely used in commercial coating applications. Epoxies showed good performance in corrosion prevention, solvent resistant, and good adhesion to metal surfaces. Aromatic epoxies including those derived from Bisphenol A and novalac structures do not performed well in outdoor weathering. Loss of surface glass and color fade in short exposure duration better known as chalking is well established. Additionally novalac epoxies often require solvent in the formulations in order to be suitable for coating application, which generated to VOCs.

Mowrer et al disclosed in U.S. Pat. No. 5,618,860 new polysiloxane coating and flooring compositions without the use of diisocyanate monomers. The coatings are formed from the reaction of a non-aromatic epoxy resin, a polysiloxane (with methoxy groups), and an alkoxysilane with an aminosilane hardener and a tin catalyst. Water is necessary in the composition to affect a complex series of hydrolysis-condensation reactions of siloxane and alkoxysilane, also known as the sol-gel reactions. During this curing process alcohols such as methanol or ethanol are created as VOC. The reference also disclosed high solid loadings in the compositions and the resulting coatings showed improvement on resistance to weathering, corrosion, chemicals (solvents, acids and bases) and high mechanical properties.

Embodiments of the invention of polysiloxane coating compositions have considerable advantages over the current isocyanate-based polyurethane topcoats. Diisocyanate monomers are not used in the synthesis of polymer coating. Volatile organic compounds (VOC) are not created in formation of topcoats. These polysiloxane topcoats also deliver improved coating performance in accordance with the above military specifications. These requirements include improved UV weathering, chemical resistance (solvents, acids and bases), corrosion prevention, adhesion to metal substrates, and free of VOC and HAPs.

Specific hybrid epoxy-siloxane oligomers (di-, tri-, and multi-functionalized) have been synthesized to deliver specific polymer properties that address the UV stability, chemical resistance, and adhesion to the primer layer requirements. The coating formulations are 2-part (2K) and packaged separately. Part A is consisted of a mixture of several epoxy-siloxane oligomers; each contributes to specific coating performance. Polyamides are used as the curing agent in Part B. Selecting the appropriate polyamide and/or polyamines at the appropriate epoxy equivalent ratio provide rapid curing at ambient conditions while maintaining a workable pot-life in the field application. Furthermore, this curing chemistry do not generate alcohol as the by-product or VOC whereas the commercial epoxy-siloxane coatings from Sherwin Williams have reported VOC in excess of 240 gram/liter or more.

Embodiments of the invention provide a polysiloxane coating that provided improved properties over the military polyurethane coatings. When formulated as a topcoat, the compositions of the embodiments showed significant resistance to sunlight and ultraviolet weathering comparing to that of the polyurethane coatings. Compositions also showed chemical resistance to solvents, acids and bases, corrosion prevention, adhesion to metal substrates. Furthermore, no volatile organic compounds (VOC) are generated during the curing and forming of the polysiloxane topcoats.

Embodiments of the coating compositions are prepared by combining these components: a mixture of epoxy-siloxane oligomers having one or more aliphatic epoxy groups as showed in Schemes 1-4, an amine hardener, a color pigment or filler, and an optional of organic solvents.

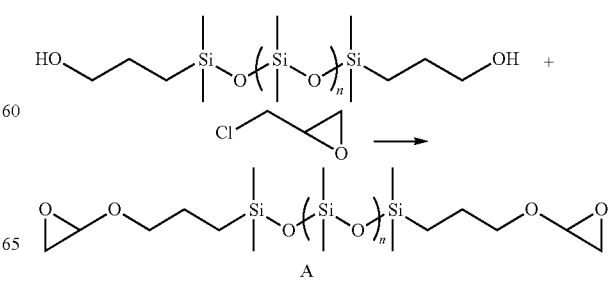

A

Scheme 1 is the synthesis of glycidyl ether terminated siloxane oligomers A, according to embodiments of the invention.
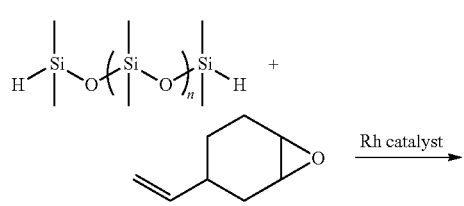
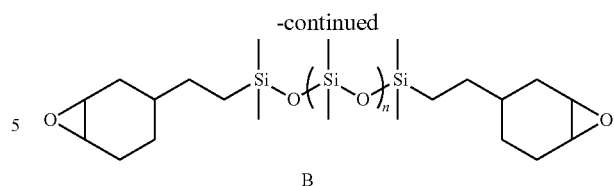
Scheme 2 is the synthesis of cycloaliphatic epoxy terminated siloxane oligomers B, according to embodiments of the invention.
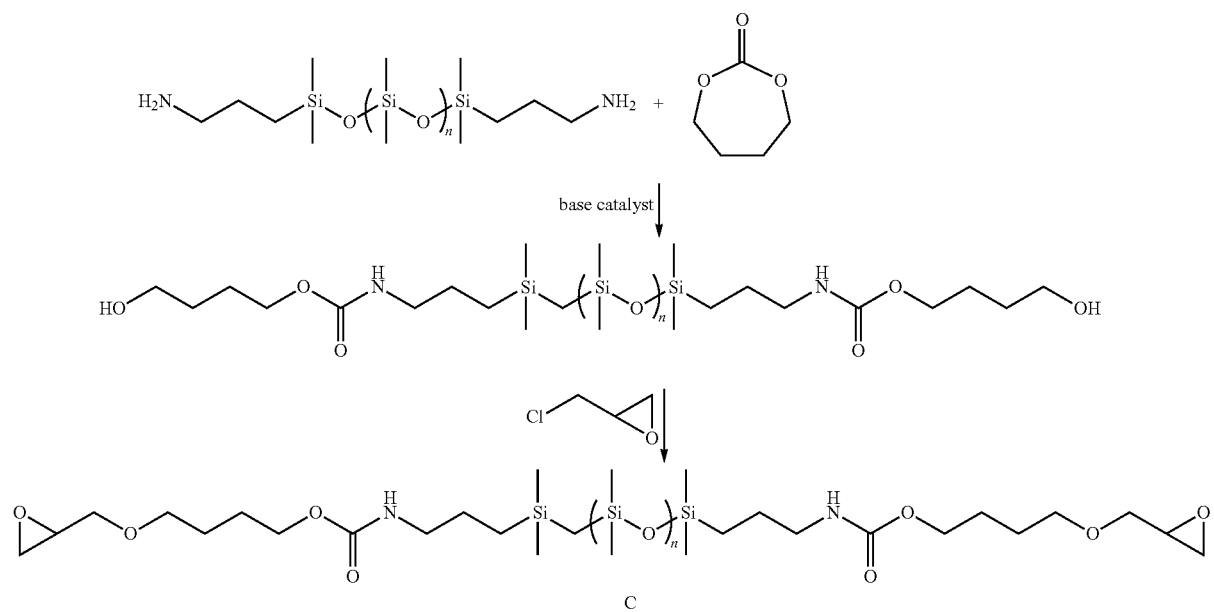
Scheme 3 is the synthesis of epoxy-urethane-siloxane oligomers, C, according to embodiments of the invention.
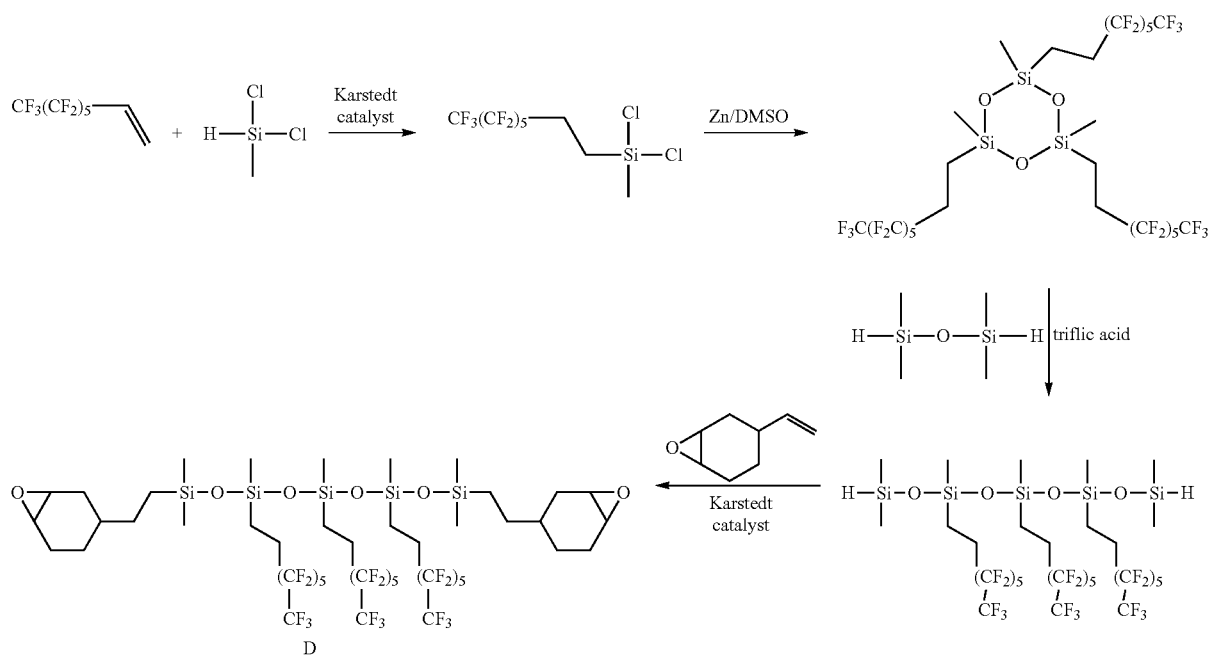

Scheme 4 is the synthesis of cyclohexyl epoxy terminated siloxanes, D, with fluorinated pendent groups, according to embodiments of the invention.

Embodiment of the invention provide polysiloxane oligomers, A and B, having polysiloxane as a core segment, and having at least one epoxy group (glycidyl ether and cycloalkane) at the either the termini or on the side chains of the oligomers. The synthesis of these oligomers is showed in Schemes 1 and 2. In these embodiments, these oligomers are liquid rather than solid at ambient temperature, and having epoxide equivalent weight (EEW) of about 300 to about 3,000. Furthermore, these siloxane oligomers, formula A, B, C and D do not have free hydroxyl functional groups either on the backbone or the side chains. The siloxane repeat unit, n, as specified in the formula A and B are in the range of 1 to about 50.

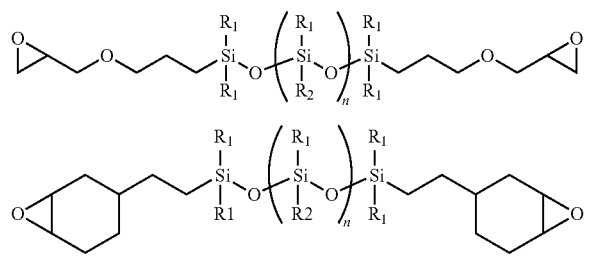

Other embodiments of the invention provide polysiloxane oligomers, 3, with urethane linkage in the polymer backbone. Analogous to polyurethane coatings the amide linkages of this oligomer improve adhesion to the primer layer by hydrogen bonding. The synthesis of the epoxy-urethane-siloxane oligomers is showed in Scheme 3. These oligomers are preferably liquid rather than solid at ambient temperature, and having epoxide equivalent weight (EEW) of about 300 to about 3,000. Furthermore, the siloxane repeat unit, n, as specified in the formula C is in the range of 1 to about 50.

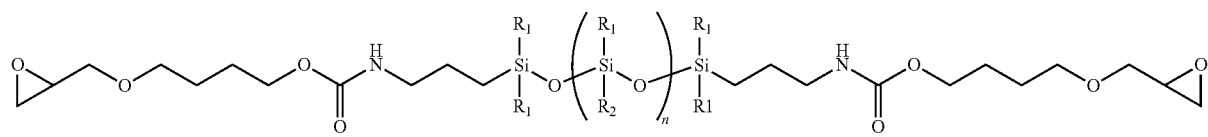

Still other embodiments of the invention provide polysiloxane oligomers, 4, with fluorinated alkyl side chains that prevent corrosion of the underlying metal substrates. The synthesis of the fluorinated epoxy-siloxane oligomer is as showed in Scheme 4. Embodiments of these oligomers are liquid rather than solid at ambient temperature, and having epoxide equivalent weight (EEW) of about 700 to about 1,200.

Embodiments of the compositions include a mixture of epoxy-siloxane oligomers that reacts with amine hardener in the curing reaction. The weight ratio of these ingredients is calculated based on the stoichiometry between the oligomer's epoxide equivalent weight (EEW) and the curing agent's amine hydrogen equivalent weight (AHEW). Rapid curing at ambient conditions is achieved in these compositions that provide strong and tough networks. The weight ratios of three types of epoxy-siloxanes in the coating compositions have been optimized to provide these material properties with respect to the mechanical properties, adhesion to metal substrates, environmental exposure (outdoor weatherability, VOC and HAP, and corrosion prevention), and chemical resistance (solvents, acids and bases).

Another aspect of this curing chemistry involves the ring opening reaction of epoxy group with an amine, the resin hardener. By-product including alcohol are not generated in the reaction as VOC. The kinetic of curing reaction is fast at ambient conditions and specific amine hardener must be used to maintain a workable pot-life for the coating application.

Amine hardeners are widely used to cure epoxy resins and the curing kinetics are established. The most commonly used primary and secondary amines include diethylenetriamine, triethylenetetramine, aminoethylpiperazine and other cycloaliphatic diamines. Aliphatic amines cure faster in ambient temperature than those of aromatic amines. Another class of polyamines, amine-terminated polyamides, also have reactivity with epoxies similar to that of aliphatic amines. Because polyamides are of relatively large polymers of various structures, they provide cured materials ranging from hard to semi-flexible. Additional benefit is that polyamide cured formulations have longer pot life than those formulations cured with aliphatic polyamines. Commercial polyamide hardeners are available from Air Products (Ancamide 221, Ancamide 2353, Ancamide 2445, Ancamide 206A, Ancamide 261A, and Ancamide 351 A). Commercial hardeners are formulated products which comprise several amine compounds. Examples listed above have a range of amine hydrogen equivalent weight values (AHEW) ranging from about 200 to about 400 mg KOH/gram hardener.

Several aspects of the epoxy ring opening curing mechanism described above is different from that of organoalkoxy-siloxanes as disclosed by Mowrer et al. The curing of organoalkoxy-siloxanes involves several reactions simultaneously. First, the alkoxy group is hydrolyzed in the pres-

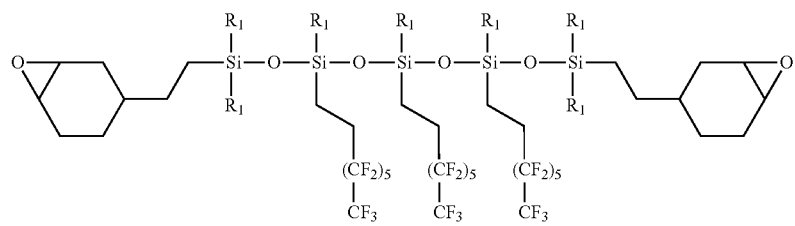

ence of water that generates alcohol and the corresponding silanol. The subsequent condensation reactions between the silanol with either an alkoxysiloxane or another silanol generate alcohol and water, respectively to form a network. Water is required in the compositions to complete the hydrolysis and condensation reactions. In addition, aminoalkoxysilanes are used as the hardener to react with both the alkoxysiloxane groups of the siloxane resin and the epoxy groups of the epoxy resin in the coating composition.

Another aspect of this embodiment that is different from epoxy-polysiloxane oligomers disclosed by Iyer et al. (U.S. Pat. No. 01,581,59), where oligomers (structures I-IV) contain two hydroxyl functional groups, while a cyclic oligomer (V) do not contain hydroxyl functional groups. The cured network are expected to have considerable different material properties than this embodiment where oligomers, formula A-D do not contain free hydroxyl groups in either the backbone or the side chains.

As military topcoats organic and inorganic pigments will be formulated to match color palettes specified by the Armed Forces. Pigments are finely divided particles that impart color through either absorption or reflection of visible light. Each pigment has distinct infrared-reflective characteristics. In embodiments, the coating compositions are formulated with the IR-reflective pigments, which showed significant higher total solar reflectance than those formulated with conventional pigments of the same color palette. When majority of solar heat is being reflected instead of being absorbed, the painted surface retains a lower surface temperature. More importantly, durability of the coating and the color fading are greatly improved in the exposure to prolonged sunlight weathering. These pigments are commercial available from Shepherd Color Company as Complex Inorganic Colored Pigments (CICP). They are thermally stable up to about 800° C. and are of mixed metal oxides that have more than one metal oxide in its crystal structure. When the pigments are formulated into the siloxane resins, they are grinded using a ball-milling or roll-milling process and sieved to provide about particle size less than 300 mesh U.S. sieve size. Surface active compounds such as pigment wetting agents are added to the pigments that facilitate surface wetting and disperse the particles uniformly in the siloxane resins. Solvent-borne wetting agents are particularly suitable in the present coating composition. Defoamers are also added to improve leveling and uniformity of freshly applied coating.

One or more solvent may be added to thin the coating composition. In spraying application using air and airless spray guns, atomization of the composition is necessary to cover large surfaces. Applying the coating by rolling may not require added solvents.

Examples 1-4 describe the preparation of Part A of the siloxane resin which is comprise of a mixture of siloxane oligomer, pigments, dispersing agent, and defoamer, and amine hardener in Part B of embodiments of the invention. The ingredients and their respective weights are provided in each example. The coating compositions are combined with an amine hardener. Curing rates are expected to be fast as ambient conditions as the epoxy-amine cure chemistry.

Example 1

Part A of the epoxy-siloxane is prepared by combining 100 grams of the epoxy-siloxane oligomer A with EEW of about 900, 20 grams of Shepard Green 410 pigment, 1 gram of Elementis Nuosperse 700 (dispersing agent) and 0.5 gram of BYK 080 (defoamer). The mixture was mixed for 8 hours with an overhead stirrer.

Example 2

Part A of the epoxy-siloxane is prepared by combining 50 grams of the epoxy-siloxane oligomer A with EEW of about 500, 50 grams of the epox-siloxane oligomer A with EEW of about 3,000, 20 grams of Shepard Green 410, 1 gram of Elementis Nuosperse 700, and 0.5 gran of BYK 080 (defoamer). The mixture was mixed for 8 hours with an overhead stirrer.

Example 3

Part A of the epoxy-siloxane is prepared by combining 50 grams of the epoxy-siloxane oligomer A with EEW of about 900, 50 grams of the epoxy-urethane-siloxane oligomer C with EEW of about 2,000, 20 grams of Shepard Green 410, 1 gram of Elementis Nuosperse 700, and 0.5 gran of BYK 080 (defoamer). The mixture was mixed for 8 hours with an overhead stirrer.

Example 4

Part A of the epoxy-siloxane is prepared by combining 90 grams of the epoxy-siloxane oligomer A with EEW of about 900, 10 grams of the epoxy-fluoroalkyl-siloxane oligomer D with EEW of about 1,200, 20 grams of Shepard Green 410, 1 gram of Elementis Nuosperse 700, and 0.5 gran of BYK 080 (defoamer). The mixture was mixed for 8 hours.

Prior to applying the coating onto a metal substrate, 100 g of the siloxane mixture as Part A from examples 1-4, 22-30 grams of Air Products Ancamide 221, an amine hardener (Part B) was added. The amount hardener varies because of the difference in EEW values in examples 1-4. It was mixed for another 10 minutes, degassed for 5 minutes, and applied using a spray gun onto an anodized aluminum 2024-T3 panel pre-primed with Sherwin Williams CM0483787. The resulting overcoat is dried to touch in less than one hour, and through drying is completed in less than 8 hours.

These prevent compositions could provide similar material properties comparable to other siloxane coating compositions using different starting materials such as alkoxysiloxanes. The resulting crosslinking networks are similar but not identical. Hence these epoxy-siloxane oligomers of the present coating composition could provide similar coating properties such as exterior durability (outdoor weathering), chemical resistance, coating integrity in chemical decontamination, and camouflage properties in accordance MIL-DTL-64159B and MIL-DTL-53039D). In addition, the present coating compositions could further provide improved coating properties such as adhesion when exposed to water, jet fuels, hydraulic oils, lubricating oils, and organic solvents, corrosion prevention, and exterior durability (no color fade >3,000 hours) in accordance to MIL-PRF-85285D.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Major advantages of the present invention include a simpler and direct method to form a crosslinked epoxy-siloxane topcoats than the method using alkoxysiloxanes. Furthermore, the curing chemistry does not generate volatile organic compounds (VOC) and hazard air pollutants (HAPs).

Another aspect of the advantage of the present invention is the formulation flexibility where a range of coating property could be obtained from formulations using 3 types of epoxy-siloxane oligomers (Schemes 1-4). For instance, the molecular weight of the siloxane segment of difunctional oligomers is directly related to the crosslinking density, mechanical property and chemical resistance of the resulting network. Lower molecular weight siloxanes provide highly crosslinked and stiff networks that are highly chemical resistant. Longer siloxane oligomers provide more flexible materials but having lower crosslinking density and poorer resistant to chemical exposure. Topcoats must have both strong and toughness properties as measured by their tensile strength and impact resistance, respectively. The present invention of coating composition would use at least two different molecular weight siloxane oligomers to control the crosslinking density precisely that provides a balance of mechanical property and solvent resistant as showed in Example 2. Under these conditions, nano-scale phase separation may occur to form siloxane-rich and epoxy-rich domains. This morphology provides stress-relieve mechanism for high impact resistance property commonly found in copolymers with a balance of toughness and high tensile strength such as styrene-acrylics and acrylonitrile-butadiene-styrene (ABS) resins.

A second aspect of the advantage of the present invention is the formulation flexibility to increase adhesion of the siloxane topcoat to the primer layer through the hydrogen bonding of the urethane linkage in the backbone of the siloxane oligomer, C. The amine-cured epoxy moiety also contributes to the adhesion to primer layer. In example 3, a composition is showed that use an epoxy-urethane-siloxane and an epoxy-siloxane oligomers.

A third aspect of the advantage of embodiments include the formulation flexibility to improve corrosion prevention of the topcoat. Fluorinated pendent groups or on the polymer backbone have showed to improve corrosion on both aluminum and steel surfaces. In example 4, a composition is showed that use a fluorinated epoxy-siloxane and an epoxy-siloxane oligomers.

The epoxy-siloxane oligomers synthesized in the present invention are of lower molecular weights and are low viscosity liquids at ambient temperature; hence very high solid loading in the coating composition is possible during formulating. These coating compositions may be sprayed without adding solvents. However, small amount of organic solvents may be added to improve atomization, flow and leveling when the coating is being applied by sprayers, rollers, and brushes. The maximum amount of added solvent in the composition is limited by the regulation under the Clean Air Act.

Embodiments of the invention generally relate to epoxy-polysiloxane prepolymer compositions including, a mixture of polysiloxane oligomers having at least two epoxy groups, at least one monofunctional epoxy-siloxane as a reactive diluents, at least one amine, at least one pigment and/or at least one filler, at least one pigment dispersing agent, and at least one defoamer. Embodiments further include the composition having at least one organic solvent. In embodiments, the epoxy groups are selected from the group of cycloaliphatic epoxides, glycidyl ether epoxides, hydrogenated Bisphenol A glycidyl ether epoxides, and any combination thereof. In embodiments, the polysiloxanes (formula A and B) include alkyl, aryl, arylene side chains $R_1$ and $R_2$ that are selected from the carbon of 1 to 6. The siloxane repeat unit, n, as specified in the formula A and B are in the range of 1 to about 50.

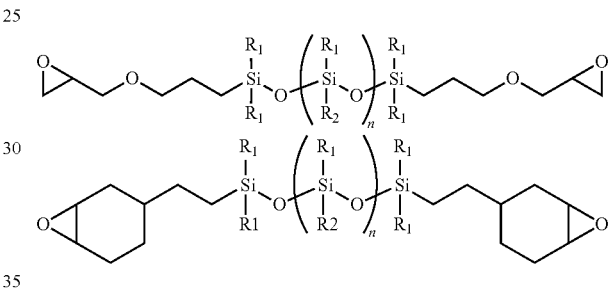

Formula A & B. In other embodiments, the urethane linkage polysiloxanes includes between the siloxane segments and the epoxy groups. In embodiments, the oligomers (formula C) include alkyl, aryl, arylene side chains $R_1$ and $R_2$ that are selected from the carbon of 1 to 6. The siloxane repeat unit, n, as specified in the formula C is in the range of 1 to about 50.

(C)

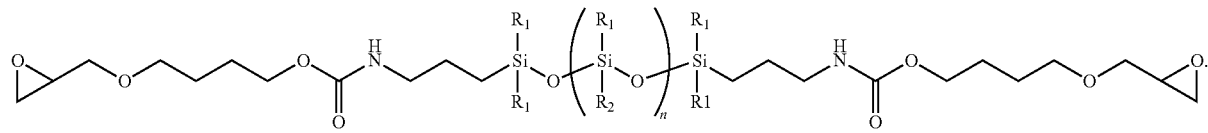

In other embodiments, the polysiloxanes (formula D) include fluorinated pendent groups with C8 or less for each Si atom, and R1 are selected from the carbon of 1 to 6.

(D)

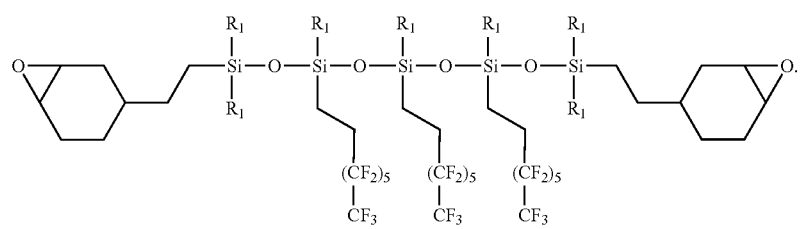

In yet other embodiments, the polysiloxane oligomers having epoxy equivalent weight molecular weight in the range of from about 300 to about 3,000. In still yet other embodiments, the polysiloxane oligomers comprising of urethane linkage between the siloxane segments and the epoxy groups to have epoxy equivalent weight molecular weight in the range of from about 300 to about 3,000. In other embodiments, the polysiloxanes include fluorinated pendent groups to epoxy equivalent weight molecular weight in the range of from about 700 to about 1,200.

In embodiments, at least one amine is selected from the group of primary and secondary monoamines, polyamines, amine-terminated polyamides will be utilized as curing agent or hardener. In other embodiments, the amine is a hardener having amine hydrogen equivalent weight values ranging from about 200 mg KOH/gram to about 400 mg KOH/gram hardener. In embodiments, the composition has a weight ratio of epoxy-siloxane oligomers to an amine hardener of in the range from 2:1 to about 10:1. In embodiments, the pigments and the fillers include finely divided particle material selected from the group consisting of organic and inorganic pigments, inorganic pigments having high infrared-reflective property and having more than one metal oxide in the complex. In other embodiments, the composition having from 1 and to about 50 percent by weight of the pigments and the fillers based on the total weight of the coating composition. In yet other embodiments, the composition having from 1 and to about 20 percent by weight the pigment dispersing agents of the coating composition.

In embodiments, the composition has from 1 and to about 10 percent by weight the defoamer of the coating composition. In other embodiments, the composition is formulated with at least one organic solvent selected from alkyl acetates and VOC exempt solvents including Oxsol-100 at a concentration of 1 to about 50 percent by weight. In embodiments, the epoxy-siloxane coating composition is formulated as a two-part system having Part A and Part B, where Part A includes at least one epoxy-siloxane prepolymer, pigments, and fillers, where Part B includes at least one amine hardener, and where Part A and Part B are kept separately.

An aspect of the invention generally relates to methods of applying epoxy-polysiloxane prepolymer compositions including, mixing at least one epoxy-siloxane prepolymer, pigments, and fillers (Part A) with at least one amine hardener (Part B) at a weight ratio in the range from 2:1 to about 10:1, applying the mixture onto a primed surface by spraying or rolling technique to produce a coating, and curing the coating at ambient temperature and relative humidity.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An epoxy-polysiloxane prepolymer composition, comprising:
   a mixture of polysiloxane oligomers having at least two epoxy groups and is hydroxyl group free, comprising

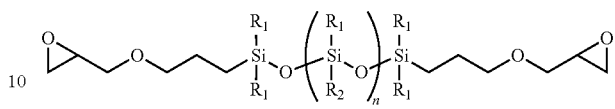

and

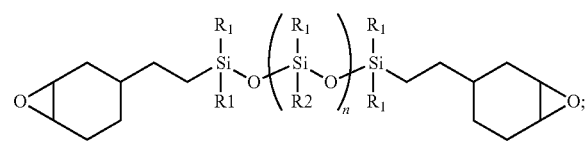

wherein R1 and R2 are selected from alkyl, aryl, and arylene side chains having 1 to 6 carbon atoms and, wherein n is 1 to about 50;
   at least one siloxane with one epoxy group as reactive diluent;
   at least one amine;
   at least one pigment and/or at least one filler;
   at least one pigment dispersing agent; and
   at least one defoamer.

2. The composition according to claim 1, wherein said composition further comprising at least one organic solvent.

3. The composition according to claim 1, wherein said polysiloxane oligomers having epoxy equivalent weight molecular weight in the range of from about 300 to about 3,000.

4. The composition according to claim 1, wherein at least one said amine is selected from the group consisting of primary monoamines, secondary monoamines, polyamines, and amine-terminated polyamides.

5. The composition according to claim 1, wherein said amine is a hardener having amine hydrogen equivalent weight values ranging from about 200 mg KOH/gram to about 400 mg KOH/gram hardener.

6. The composition according to claim 1, wherein said composition having a weight ratio of polysiloxane oligomers to an amine hardener in the range from 2:1 to about 10:1.

7. The composition according to claim 1, wherein said composition having from 1 to about 50 percent by weight of said pigments and said fillers based on the total weight of the composition.

8. The composition according to claim 1, wherein said composition having from 1 and to about 20 percent by weight of said pigment dispersing agents based on the total weight of the composition.

9. The composition according to claim 1, having from 1 and to about 10 percent by weight of said defoamer based on the total weight of the composition.

10. The composition according to claim 1, wherein said composition comprises at least one organic solvent selected from alkyl acetates and VOC exempt solvents at a concentration of 1 to about 50 percent by weight.

* * * * *